US006762940B2

United States Patent
Zaremba

(10) Patent No.: US 6,762,940 B2
(45) Date of Patent: Jul. 13, 2004

(54) PLUGGABLE OPTICAL TRANSCEIVER WITH PUSH-PULL ACTUATOR RELEASE COLLAR

(75) Inventor: Adam Zaremba, Thousand Oaks, CA (US)

(73) Assignee: Optical Communications Products, Inc., Woodlands, CA (US)

( * ) Notice: Subject to any disclaimer, the term of this patent is extended or adjusted under 35 U.S.C. 154(b) by 154 days.

(21) Appl. No.: 10/249,245

(22) Filed: Mar. 26, 2003

(65) Prior Publication Data

US 2003/0206403 A1 Nov. 6, 2003

Related U.S. Application Data

(60) Provisional application No. 60/377,934, filed on May 2, 2002.

(51) Int. Cl.[7] ................................................. H05K 7/00
(52) U.S. Cl. ....................... 361/728; 361/732; 361/754; 439/352; 439/607
(58) Field of Search ................................ 361/728, 730, 361/732, 740, 754, 759, 785, 798, 801; 439/607, 608–610, 352, 358, 359, 357; 385/92

(56) References Cited

U.S. PATENT DOCUMENTS

| | | | | |
|---|---|---|---|---|
| 5,755,587 A | * | 5/1998 | Sakai et al. | 439/352 |
| 6,371,787 B1 | * | 4/2002 | Branch et al. | 439/352 |
| 6,430,053 B1 | * | 8/2002 | Peterson et al. | 361/728 |
| 6,434,015 B1 | * | 8/2002 | Hwang | 361/754 |
| 6,461,186 B1 | * | 10/2002 | Endo | 439/352 |
| 6,530,785 B1 | * | 3/2003 | Hwang | 439/76.1 |
| 6,553,603 B1 | * | 4/2003 | Jolly | 15/161 |
| 6,556,445 B2 | * | 4/2003 | Medina | 361/728 |
| 2002/0093796 A1 | | 7/2002 | Medina | |
| 2002/0114141 A1 | | 8/2002 | Medina | |

* cited by examiner

Primary Examiner—David Martin
Assistant Examiner—Thanh S. Phan
(74) Attorney, Agent, or Firm—Barlow, Josephs & Holmes, Ltd.

(57) ABSTRACT

A pluggable optical transceiver having a slidable actuator assembly for quickly and easily removing the transceiver from a receptacle cage assembly is provided. The actuator assembly includes an actuator collar and slide member that can slide in a forward and rearward direction. As force is exerted on the actuator collar, the actuator and slide member slide rearwardly causing the transceiver to become disengaged from the receptacle. In this manner, the transceiver is released and can be removed easily from the receptacle.

11 Claims, 3 Drawing Sheets

US 6,762,940 B2

PLUGGABLE OPTICAL TRANSCEIVER WITH PUSH-PULL ACTUATOR RELEASE COLLAR

CROSS REFERENCE TO RELATED APPLICATIONS

This application claims the benefit of U.S. Provisional Application No. 60/377,934 having a filing date of May 2, 2002.

BACKGROUND OF INVENTION

The instant invention relates to pluggable optical transceivers. Particularly, the invention relates to a push-pull actuator release collar for quickly and easily removing a small form factor pluggable (SFP) transceiver from a transceiver-receptacle cage assembly.

Pluggable optical transceivers are known in the art, and have been the subject of various industry standards and sourcing agreements between common vendors. In particular, multiple vendors have entered into a multi-source agreement (MSA) setting forth common standards and specifications for small form factor pluggable (SFP) transceivers. By way of review, an optical transceiver is an integrated fiber optic component including an optical transmitter and an optical receiver. The pluggable transceiver includes a first end with a fiber optic connector and a second end with an electrical connector. For the SFP transceiver, the fiber optical connector is an LC-type duplex connector. The electrical connector is a card edge connector that is received into a female electrical connector housed inside a receptacle. The receptacle assembly is mounted on a daughter card of a host system. A common mechanical and electrical outline for the SFP transceiver is defined by the MSA. However, each individual manufacturer (vendor) is responsible for its own development and manufacturing of the SFP transceiver including developing a method for releasing the transceiver from the receptacle assembly.

The MSA provides some specifications for securing the transceiver to the receptacle cage. Particularly, the MSA specifies a spring-loaded latching tab in the receptacle that engages a standard locking detent on the bottom surface of the transceiver. When the transceiver is slidably inserted into the receptacle, the detent engages the latching tab and the transceiver is physically retained in place by the interlocking engagement of the detent to the latching tab.

Turning to the subject of the present invention, the MSA does not provide any standard mechanisms for releasing and removing the transceiver from the receptacle cage. In this regard, the instant invention provides a novel actuator assembly for disengaging the latching tab from the detent, thus allowing a person to easily remove the transceiver.

SUMMARY OF INVENTION

The actuator assembly of the present invention comprises two separate components. The first component is a slide member slidably mounted on the bottom surface of the transceiver. The slide member is located adjacent to the locking detent on the transceiver.

The second component of the actuator assembly is an actuator collar that is mounted on and surrounds the front end of the transceiver (i.e., the LC Duplex connector end of the transceiver). The actuator collar, adapted to slide in a forward and rear direction, is captured between the slide member and shoulder abutments on the transceiver housing. Pushing the actuator collar rearwardly causes the lower horizontal leg (i.e., cross-bar) of the collar to engage the slide member. The actuator collar pushes the slide in a linear direction rearwardly towards the latching tab in the receptacle cage. The slide member has angled cam-surfaces that engage the latching tab and cause the tab to become disengaged from the locking detent. Thus, the transceiver is released from the receptacle cage. Kick-out springs in the receptacle cage automatically force the transceiver to slide forward. The user can then pull the transceiver easily out of the receptacle.

The slide member further comprises a pair of leaf springs. When the transceiver is released and pulled out of the receptacle cage, the leaf springs force the actuator collar and slide member to spring back to their initial forward positions.

Among the objects of the instant invention are: providing an optical transceiver module having an integrated actuator assembly; providing an actuator assembly having a slide member that can engage a latching tab in a receptacle cage to unlock a transceiver module from the cage; and providing an actuator assembly, wherein the profile of the assembly is substantially within the defined dimensions of the transceiver module.

Other objects, features and advantages of the invention shall become apparent as the description thereof proceeds when considered in connection with the accompanying illustrative drawings.

BRIEF DESCRIPTION OF DRAWINGS

In the drawings which illustrate the best mode presently contemplated for carrying out the present invention.

DETAILED DESCRIPTION

Figure 1:
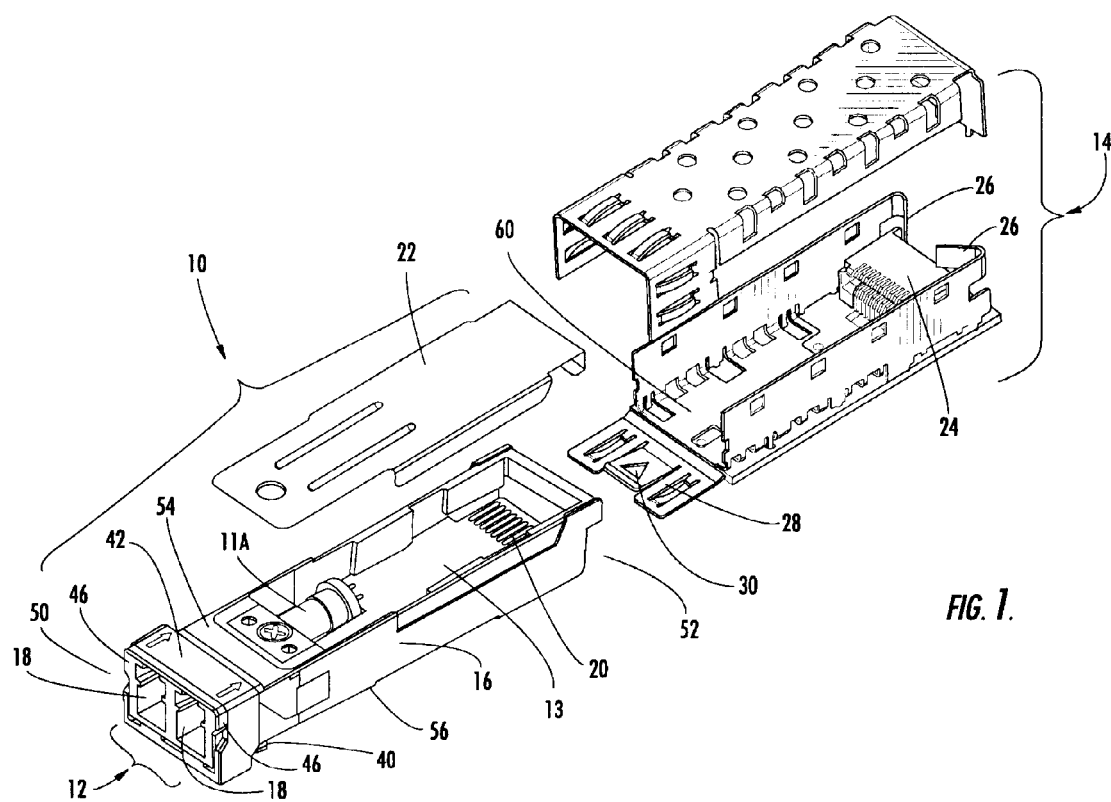
FIG. 1 is a perspective top view of a two-part receptacle cage and a transceiver module having an actuator assembly in accordance with the present invention.
Figure 2:
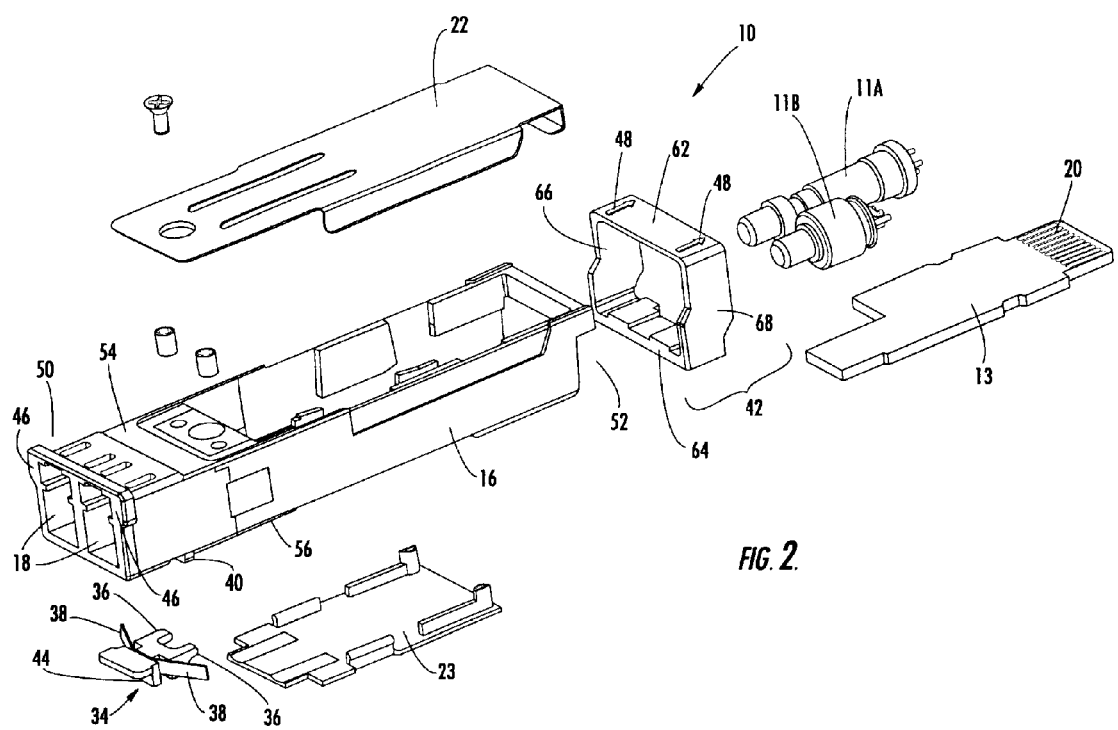
FIG. 2 is an exploded perspective view of a transceiver module showing the actuator release collar and slide member in accordance with the present invention.
Figure 3:
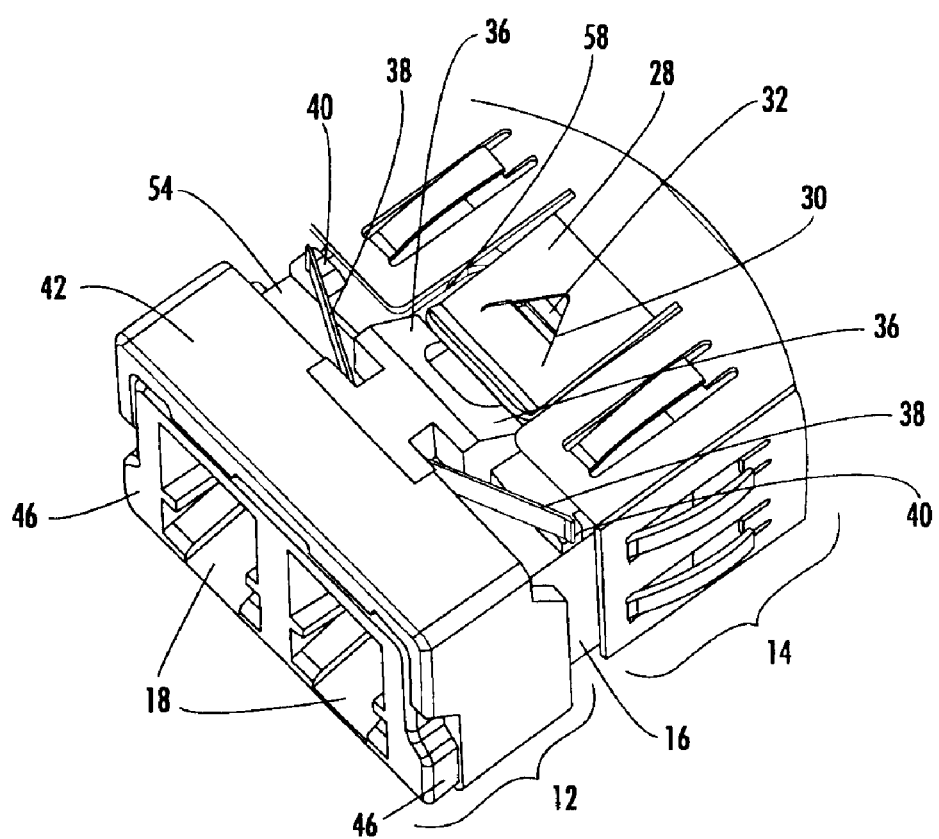
FIG. 3 is a perspective bottom view of the transceiver module showing the slide member and leaf springs in further detail.

Referring now to the drawings, the pluggable transceiver package of the instant invention is illustrated and generally indicated at 10 in FIGS. 1–3. As will be hereinafter more fully described, the instant pluggable transceiver module 10 includes an integrated actuator assembly generally indicated at 12 for disengaging the transceiver 10 from a corresponding receptacle cage generally indicated at 14.

Referring to FIGS. 1 and 2, the optical transceiver 10 is generally an integrated fiber optic component including an optical transmitter 11A and an optical receiver 11B. The pluggable transceiver 10 includes a plastic housing frame 16 having a first end 50 with fiber optic connector ports 18 formed therein, and an opposite second end 52 with an electrical edge connector 20 projecting therefrom. For the SFP transceiver 10, the fiber optic connector ports 18 are an LC-type duplex connector.

The housing 16 of the transceiver 10 includes an upper (top) surface 54 and lower (bottom) surface 56. The lower surface 56 of the housing 16 includes a slide member 34 and a locking detent 32. The locking detent 32 secures the transceiver 10 in the receptacle cage 14 as described in further detail below. More specifically, the slide member 34 and locking detent 32 are mounted in a channel 58 that extends longitudinally along at least a portion of the lower surface 56 of the transceiver 10. The locking detent 32 is located at the rear of the longitudinal channel 58 adjacent to the slide member.

As shown in FIG. 2, the optical transmitter 11A and receiver 11B are mounted on a circuit board 13 that is received inside the housing frame 16 of the transceiver 10. The rear edge of the circuit board 13 forms the electrical edge connector 20 that protrudes from the open end of the housing frame 16. A metallic cover 22 encloses the top surface 54 of housing frame 16 (FIG. 1) and provides electromagnetic interference (EMI) shielding and case grounding to the chassis ground. A portion of the bottom surface 56 of the housing 16 is enclosed by a separate plastic cover 23. The outer dimensions of the male plug end of the LC-type duplex fiber optic cable are standard, and therefore the corresponding female fiber optic connector ports must also be standard dimensions. The first end 50 of the housing frame 16 is generally rectangular, slightly longer side-to-side, when viewed from the front. The width and height of the housing frame 16 are fixed by SFP standards. The two connector ports 18 are symmetrically positioned and arranged within the rectangular outline. Latching surfaces are provided within the connector ports 18 to permit engagement with the standard latch members of the fiber optic cable. The arrangement of the actuator collar 42 around the outside surface of the first end 50 of the transceiver 10 is described further below.

Referring to FIG. 1, the electrical edge connector 20 is received into a female electrical connector 24 housed inside the receptacle assembly 14 which is in turn mounted on a daughter card of a host system (not shown). The receptacle cage 14 includes kick-out springs 26 located at the rear end of the cage 14 which engage the rear end 52 of the transceiver 10 and bias the transceiver 10 outwardly. A spring-loaded latch tab 28 is located at the open forward end 60 of the receptacle cage 14. The latching tab 28 includes an opening or aperture 30 therein for locking the detent 32 of the transceiver 10. In FIGS. 1–3, the opening is triangular-shaped.

During insertion of the transceiver module 10 into the receptacle cage 14, the transceiver slides into receptacle 14 and the locking detent 32 catches and locks with opening 30 in the latching tab 28. The transceiver 10 is secured to the receptacle 14 by means of detent 32 engaging and entering the opening 30 in the latching tab 28. In this manner, the transceiver 10 is locked within the receptacle 14. Basically, a person can insert the transceiver module into the receptacle cage 14 by pushing the transceiver 10 into the cage until he or she feels the resistance of the kick-out springs 26 located at the rear of the cage 14. Then, the person should push the transceiver 10 further until feeling the "click" of the detent 32 locking with the opening 30.

In order to release and remove the transceiver module 10 from the receptacle cage 14, the transceiver 10 of the present invention includes an actuator assembly 12. More particularly, the actuator assembly 12 comprises two separate components.

As shown in FIG. 3, the first component is a slide member 34 slidably mounted in a channel 58 extending along the lower surface of the housing frame 16. The slide member 34 is located adjacent to the locking detent 32. The slide member 34 is captured within the channel 58 by shoulder abutments 40.

The actuator assembly further comprises an actuator collar 42 surrounding the front end 50 of the transceiver frame 16 as further illustrated in FIG. 3. More particularly, the actuator collar is a rectangular-like shaped, integrated structure including opposing upper 62 and lower 64 horizontal legs (or cross-bars) that connect two vertical side arms 66 and 68. The first end 50 of the transceiver housing frame 16 includes a shoulder portion 46 have a relatively small thickness so that the vertical side arms 66 and 68 of the actuator collar 42 remain flush with the transceiver housing 16. As a result, the entire transceiver module 10 can meet generally accepted SFP outer dimensional specifications.

A person can push the actuator collar 42 rearwardly, i.e., in the direction of arrows 48 as shown on the collar 42 in FIG. 2. The lower horizontal leg 64 of the collar 42 acts as a cam and pushes the slide member 34 in a linear direction rearwardly towards the latching tab 28 in the receptacle cage 14. The slide member 34 has angled cam surfaces 36 at its rear end that engage the surface of the latching tab 28, thereby causing the locking detent to become separated from the opening 30 and releasing the transceiver 10 from the receptacle cage 14. With the locking detent 32 and latching tab 28 disengaged, the kick-out springs 26 automatically force the transceiver 10 to slide outwardly. The user can then simply pull the transceiver 10 forwardly out of the receptacle 14.

As shown in FIGS. 2 and 3, the slide member 34 further comprises a pair of leaf springs 38. Initially, the transceiver 10 is locked in the receptacle cage 14 with the actuator collar 42 and slide member 34 in a forward resting position. When a person pushes the actuator collar 42 rearwardly and causes the cross-bar 64 to make contact with the slide member 34, the springs 38 are forced rearwardly. The slide member 34 moves in a rearward direction and engages the latching tab 28 on the receptacle cage 14, thereby releasing the transceiver from the cage 14. Subsequently, the springs 38 force the slide member 34 and actuator collar 42 to spring back to their original forward positions.

While there is shown and described herein certain specific structures embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A pluggable optical transceiver module, comprising:
    a housing having a first end, an opposing second end, an upper surface, and a lower surface, said lower surface having a locking detent projecting therefrom for engaging an opening in a latching tab located in a receptacle cage; and
    an actuator assembly comprising:
        (i) an actuator collar surrounding one end of the housing, wherein force exerted on the actuator causes the actuator to slide; and
        (ii) a slide member adapted to slide towards and engage the latching tab in the receptacle as the actuator slides, thereby causing the detent to become disengaged from the opening and releasing the transceiver from the receptacle.

2. The transceiver module of claim 1, wherein the first end of the transceiver housing has a pair of fiber optic connector ports located therein and the second end of the housing has an electrical edge connector projecting therefrom.

3. The transceiver module of claim 1, wherein a metallic cover encloses the upper surface of the transceiver housing.

4. The transceiver module of claim 1, wherein the actuator has a rectangular-like, integrated structure comprising opposing upper and lower horizontal legs connected to two vertical side arms.

5. The transceiver module of claim 1, wherein the actuator collar and slide member are adapted to slide in a forward and rearward direction.

6. The transceiver module of claim 1, wherein the slide member comprises a spring biasing means for forcing the slide member in a forward and rearward direction.

7. The transceiver module of claim 1, wherein the slide member has an angled surface for engaging the latching tab.

8. The transceiver module of claim 1, wherein the slide member is disposed in a channel extending along the lower surface of the transceiver housing.

9. A pluggable optical transceiver and receptacle package assembly, comprising:

a receptacle cage for receiving the transceiver, said cage having a first end and an opposing second end, wherein the first end has a latching tab containing an opening therein; and a transceiver comprising a housing with a first end, an opposing second end, an upper surface, and a lower surface, said lower surface having a locking detent projecting therefrom for engaging the opening in the latching tab of the receptacle; and an actuator assembly, said actuator assembly comprising:
  (i) an actuator collar surrounding one end of the housing, wherein force exerted on the actuator causes the actuator to slide; and
  (ii) a slide member adapted to slide towards and engage the latching tab in the receptacle as the actuator slides, thereby causing the detent to become disengaged from the opening and releasing the transceiver from the receptacle.

10. The transceiver and receptacle package assembly of claim 9, wherein the second end of the receptacle cage has a pair of kick-out springs for releasing the transceiver.

11. The transceiver and receptacle package assembly of claim 10, wherein the assembly is mounted on a circuit board.

* * * * *